US012454793B2

(12) United States Patent
Heymer et al.

(10) Patent No.: US 12,454,793 B2
(45) Date of Patent: Oct. 28, 2025

(54) REFINER FILLING PIECE HAVING VARIABLY COATED BARS

(71) Applicant: AIKAWA FIBER TECHNOLOGIES INC., Sherbrook (CA)

(72) Inventors: Jens O. Heymer, Montreal (CA); Ronald J. Defoe, Becket, MA (US); Robert William Gooding, Montreal (CA)

(73) Assignee: AIKAWA FIBER TECHNOLOGIES INC., Sherbrook (CA)

( * ) Notice: Subject to any disclaimer, the term of this patent is extended or adjusted under 35 U.S.C. 154(b) by 291 days.

(21) Appl. No.: 18/032,740

(22) PCT Filed: Aug. 16, 2021

(86) PCT No.: PCT/CA2021/051126
§ 371 (c)(1),
(2) Date: Apr. 19, 2023

(87) PCT Pub. No.: WO2022/082295
PCT Pub. Date: Apr. 28, 2022

(65) Prior Publication Data

US 2023/0407563 A1 Dec. 21, 2023

(30) Foreign Application Priority Data

Oct. 22, 2020 (DE) ..................... 10 2020 127 783.0

(51) Int. Cl.
*D21D 1/30* (2006.01)
*B02C 7/02* (2006.01)
(Continued)

(52) U.S. Cl.
CPC ............... *D21D 1/306* (2013.01); *B02C 7/02* (2013.01); *B02C 7/12* (2013.01); *D21D 1/22* (2013.01); *D21D 1/30* (2013.01); *D21D 5/16* (2013.01)

(58) Field of Classification Search
CPC ............ D21D 5/16; D21D 1/22; D21D 1/306; D21D 1/30; B02C 7/12; B02C 7/02
See application file for complete search history.

(56) References Cited

U.S. PATENT DOCUMENTS 5,690,286 A * 11/1997 Dodd ........................ B02C 7/12 241/296
5,836,525 A * 11/1998 Garnier .................. D21D 1/306 241/296

(Continued)

FOREIGN PATENT DOCUMENTS

| | | | | |
|---|---|---|---|---|
| CN | 203451619 U | 2/2014 | | |
| DE | 69504490 T2 | 5/1999 | | |
| WO | WO-9522653 A1 * | 8/1995 | .............. | B02C 7/12 |

OTHER PUBLICATIONS

International Search Report and Written Opinion issued in PCT/CA2021/051126 dated Nov. 3, 2021, 7 pages.

(Continued)

*Primary Examiner* — Bobby Yeonjin Kim
(74) *Attorney, Agent, or Firm* — Faegre Drinker Biddle & Reath LLP

(57) ABSTRACT

Disclosed is a refiner filling piece for a refiner having a rotor that rotates about an axis of rotation and cooperates with a stator to mechanically treat a pulp containing cellulosic fibers. The refiner filling piece is mountable to the rotor or the stator. The refiner filling piece comprises a base and a plurality of spaced-apart refiner bars, each refiner bar being defined by a bar length and a bar height. At least some of the refiner bars have a surface coated with a variable coating.
(Continued)

The surface having the variable coating may be the leading surface of the bar.

18 Claims, 11 Drawing Sheets

(51) Int. Cl.
*B02C 7/12* (2006.01)
*D21D 1/22* (2006.01)
*D21D 5/16* (2006.01)

(56) References Cited

U.S. PATENT DOCUMENTS

| | | | | |
|---|---|---|---|---|
| 2012/0119007 | A1* | 5/2012 | Kallio | D21D 5/02<br>427/372.2 |
| 2013/0340700 | A1* | 12/2013 | Donahue | F02F 1/004<br>123/193.2 |

OTHER PUBLICATIONS

International Preliminary Report on Patentability issued in PCT/CA 2021/051126 dated Jan. 3, 2023, 10 pages.
English translation of Examination Notice issued in German patent application 10 2020 127 783.0 dated Jul. 27, 2021, 8 pages.

* cited by examiner

REFINER FILLING PIECE HAVING VARIABLY COATED BARS

CROSS-REFERENCE TO RELATED APPLICATION

This application is a national stage application of International Application No. PCT/CA2021/051126, filed 16 Aug. 2021, which claims priority to German Patent Application No. 10 2020 127 783.0, filed 22 Oct. 2020, both of which are herein incorporated by reference in their entireties.

TECHNICAL FIELD

The present invention relates generally to a refiner filling of a refiner for papermaking and refining of lignocellulosic material in the manufacture of paper, paperboard, tissue, towel or fiberboard products and, more particularly, to the bars of the refiner filling.

BACKGROUND

A rotary-type pulp refiner, which may be a disc-type refiner or a conical refiner, uses a replaceable refiner filling composed of refiner filling pieces that are mounted to a rotor and a stator to mechanically shear and compress cellulosic fibres in a pulp suspension. The refiner filling pieces may be one-piece (unitary) components or segments that are assembled together. The refiner filling pieces have a plurality of refiner bars that perform the shearing and compressing action on the cellulosic fibres in the pulp suspension.

In both disc-type and conical refiners, the presence of abrasives in the pulp suspension accelerates the wearing of the refiner bars of the refiner filling, thereby decreasing the depth of the grooves between adjacent bars. As a consequence, the refiner filling usually needs to be replaced fairly frequently. Typically, a refiner filling may have a service life of anywhere from 1 month to 2 years because the worn filling and shallower grooves can no longer provide adequate hydraulic capacity.

Although it is known to apply a uniform wear-resistant coating to the leading surface of the bars to prolong service life, this coating occupies a significant portion of the groove volume between the refiner bars which, in turn, can reduce the hydraulic capacity of the refiner filling. To achieve the desired hardness, these coatings are typically made of "exotic" alloys and are thus expensive. Hard coatings are by nature stiff and brittle which can lead to failure of the bars under severe operating conditions.

Accordingly, it is highly desirable to provide a new refiner bar technology that addresses at least some of the deficiencies of the prior art.

SUMMARY

In general, embodiments of the present invention provide a refiner filling piece and refiner in which the bars are coated with a variable coating.

An inventive aspect of the disclosure is a refiner filling piece for a refiner having a rotor that rotates about an axis of rotation and cooperates with a stator to mechanically treat a pulp containing cellulosic fibers. The refiner filling piece is mountable to the rotor or the stator. The refiner filling piece has a plurality of spaced-apart refiner bars, each bar being defined by a bar length and a bar height. At least some of the refiner bars have a surface coated with a variable coating. The surface that is variably coated may be the leading surface and/or the trailing surface. The variable coating may be variable in a radial direction along a length of the bar or in an axial direction over a height of the bar.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are defined in the claims and described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Disclosed herein are various embodiments of a refiner filling piece having refiner bars that are coated with a variable coating. The present specification also discloses a refiner having one or more refiner filling pieces that include the refiner bars coated with the variable coating.

Figure 1:
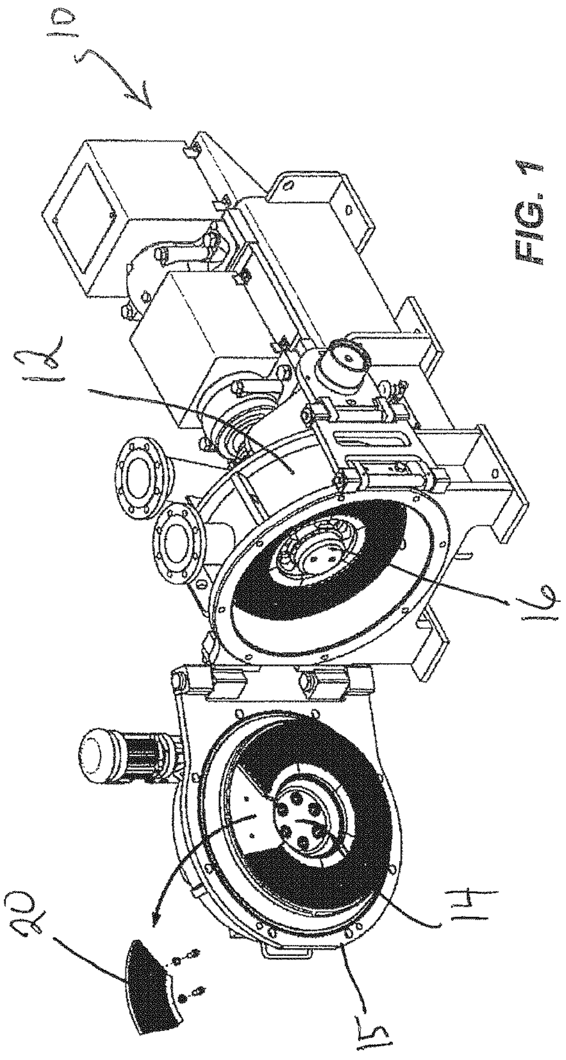
FIG. 1 is a perspective view of a refiner having a rotor and stator in accordance with an embodiment of the present invention showing the replacement of a refiner filling piece on the stator.

FIG. 1 is a perspective view of a refiner generally denoted by reference numeral 10 in accordance with one embodiment of the present invention. In the embodiment depicted in FIG. 1, the refiner 10 has a housing 12, a stator 14 and a rotor 16. The rotor rotates about an axis of rotation and cooperates with the stator to mechanically treat a pulp (or pulp suspension) containing cellulosic fibers. The axis of rotation defines an axial direction and a radial direction. In the illustrated embodiment of FIG. 1, the refiner is a disc-type refiner having a replaceable refiner filling. The refiner filling is composed of a plurality of refiner filling pieces. In the example of FIG. 1, the refiner filling pieces are segments of a generally flat, annular disc-like or plate-like structure (also referred to herein as a "plate"). However, it will be appreciated that the refiner filling pieces may be conical filling pieces in a conical refiner. For the purposes of this specification, the expression "refiner filling piece" shall be construed as encompassing a flat disc-like plate or an arcuate segment thereof, or a conical structure or an angular segment thereof. For a disc-type refiner, the refiner filling piece may be a one-piece circular plate, an annular plate or an arcuate segment that is assembled with other arcuate segments to form the complete circular or annular plate. Analogously, for a conical refiner, the refiner filling piece may be a one-piece conical (or frusto-conical) structure or an angular segment of a cone (or frustum) that is assembled with other such angular segments to form a complete conical (or frusto-conical) structure. From the foregoing, it is to be understood that a refiner filling piece may be circular, annular or conical (i.e. defining a complete 360-degree component) or segmented (i.e. defining an arcuate or angular component of less than 360 degrees that is designed to be assembled with other such segments to form the complete circular or annular plate or to form the cone, as the case may be).

FIG. 1 depicts the replacement of a refiner filling piece 20 on the stator 14. The refiner filling piece 20 may be mounted to the stator 14 using fasteners, e.g. threaded fasteners, as shown. In this example, a plurality of refiner filling pieces 20 are mounted to the stator 14 in an annular arrangement to constitute a stator-side refiner plate. In the embodiment depicted in FIG. 1, the stator 14 is mounted to a door-like cover 15 that pivots about a hinge mechanism to enable replacement of the refiner filling piece(s) 20.

Figure 2:
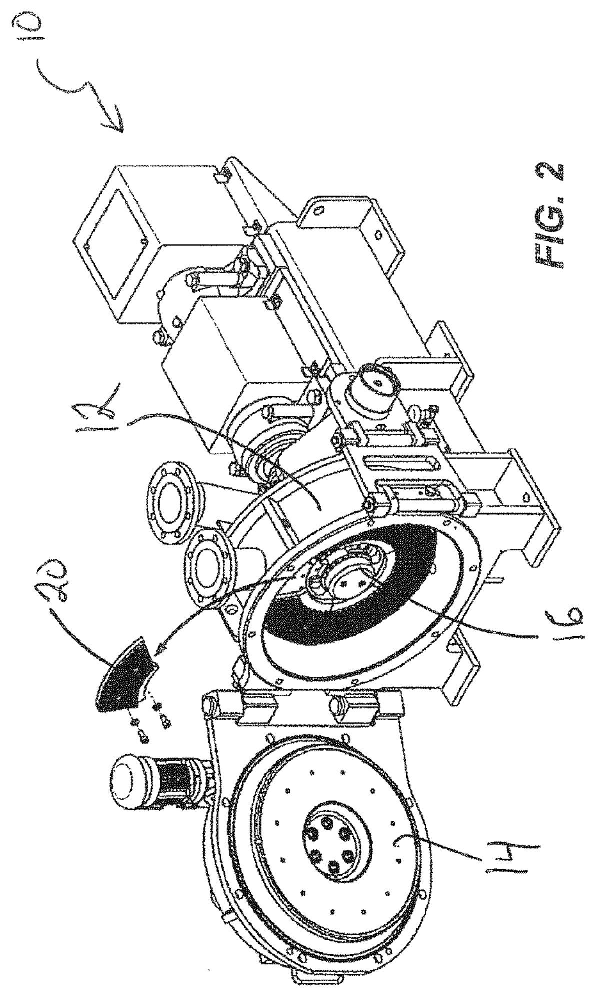
FIG. 2 is another perspective view of the refiner of FIG. 1 showing the replacement of a refiner filling piece on the rotor.

FIG. 2 is another perspective view of the refiner 10 of FIG. 1 showing the replacement of a refiner filling piece 20 on the rotor 16. The refiner filling piece 20 may be mounted to the rotor 16 using fasteners, e.g. threaded fasteners, as shown. A plurality of refiner filling pieces 20 are mounted to the rotor 16 in an annular arrangement to constitute a rotor-side refiner plate. In the embodiment depicted in FIG. 2, the rotor 16 is mounted inside the housing 12 of the refiner 10.

Figure 2A:
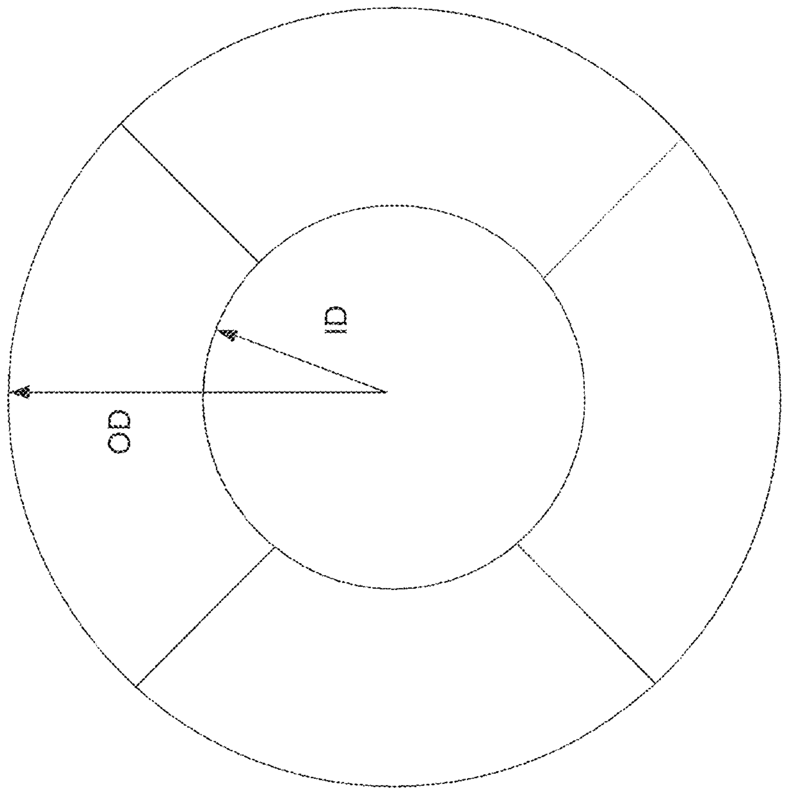
FIG. 2A is a plan view of four refiner filling pieces shaped as four arcuate segments as one example of segmented filling pieces for a disc-type refiner.

In the embodiment of FIGS. 1 and 2, the refiner filling piece 20 is a replaceable refiner filling piece having a segmented plate-like shape. When servicing the refiner, the refiner filling may be replaced, if worn, by replacing the assembly of refiner filling pieces that constitute the filling. For example, as shown in FIG. 2A, four refiner filling pieces shaped as four arcuate segments may be assembled to provide a complete annular plate structure for a disc-type refiner. The angular arc of each arcuate or segmented filling piece may be varied from what is shown in these examples. The angular arc of the filling piece may be, for example, 360 degrees, 180 degrees, 90 degrees, 45 degrees, 30 degrees, 22.5 degrees, degrees, 15 degrees, 10 degrees, etc. so that when assembled they constitute an annular arrangement having a full 360 degrees. FIG. 2A also shows that the annular refiner filling piece may be characterized by an inner diameter (ID) and an outer diameter (OD). The refiner filling piece thus extends radially from the inner diameter to the outer diameter. It will also be appreciated that a complete plate or annulus of arcuate or segmented filling pieces may be composed of filling pieces of different shapes, e.g. one 180-degree filling plus two 90-degree filling pieces, two 90-degree filling pieces plus four 45-degree filling pieces, three 60-degree filling pieces plus six 30-degree filling pieces, and so on.

As illustrated in FIGS. 3-10, the refiner filling piece 20 has a base 22. The base may have a uniform thickness in an axial direction in some embodiments although it may alternatively have a non-uniform thickness. The base extends radially from an inner diameter ID to an outer diameter OD as depicted in FIG. 2A. The refiner filling piece 20 has a plurality of spaced-apart refiner bars 30 (also known as "blades"). The bars may be spaced apart with a uniform or non-uniform groove width, i.e. the spacing between adjacent bars may vary or be constant. Optionally, the refiner bars are spaced apart by spacers 24 although in other implementations, there may be no spacers. Each bar is defined by a bar length BL extending toward the outer diameter, i.e. extending generally radially, and is defined by a bar height BH protruding generally axially from the base. The bar height may be constant or varying. In some implementations, the bar height may be, for example, a value that is within the range of 3 to 14 mm. At least some of the refiner bars 30 have a leading surface 32 coated with a variable coating 34 in an embodiment of this invention.

The variable coating is applied non-uniformly, unlike the prior art, on the leading surface of the bar and optionally also, or alternatively, on the trailing surface of the bar. The coating is variable in thickness, i.e. the coating varies dimensionally or geometrically. The thickness of the coating varies so that the coating is thickest in areas where it provides maximum wear resistance and minimizing or eliminating application in areas with limited value or where excess coating may be detrimental.

As depicted in FIGS. 3-10, the variable coating has a coating thickness that is variable along either the height of the refiner bar (e.g. increasing from the base to the top of the bar) or variable in the radial direction (e.g. increasing from the inner diameter ID to the outer diameter OD of the filling).

The coating thickness may be a function of bar height. For example, the coating thickness may increase with the height of the bar (e.g. the coating becomes thicker as the height increases to a maximum thickness at the top of the bar). This minimizes the stress concentration at the base of the bar where bending stresses are highest while maximizing the space at the base of the groove to maintain or improve hydraulic capacity. Furthermore, the variable coating reduces cost by not applying the coating where it is not needed or less effective.

The coating may also, or alternatively, be varied in thickness as a function of radial length, e.g. in a direction from the inner diameter ID (where the coating is least) to or toward the outer diameter OD (where is it greatest). This maximizes the open area or volume at the inner diameter ID which is very important for hydraulic capacity. Since the outer diameter OD of the filling piece typically has a peripheral velocity higher than that of the inner diameter ID (for a disc-type refiner), the outer diameter portion consumes more energy, applies more shear and compression, and performs the majority of the refining work. Accordingly, concentrating the coating in the outer region of the filling pieces will improve service life relative to the same amount of coating if uniformly applied.

Figure 3:
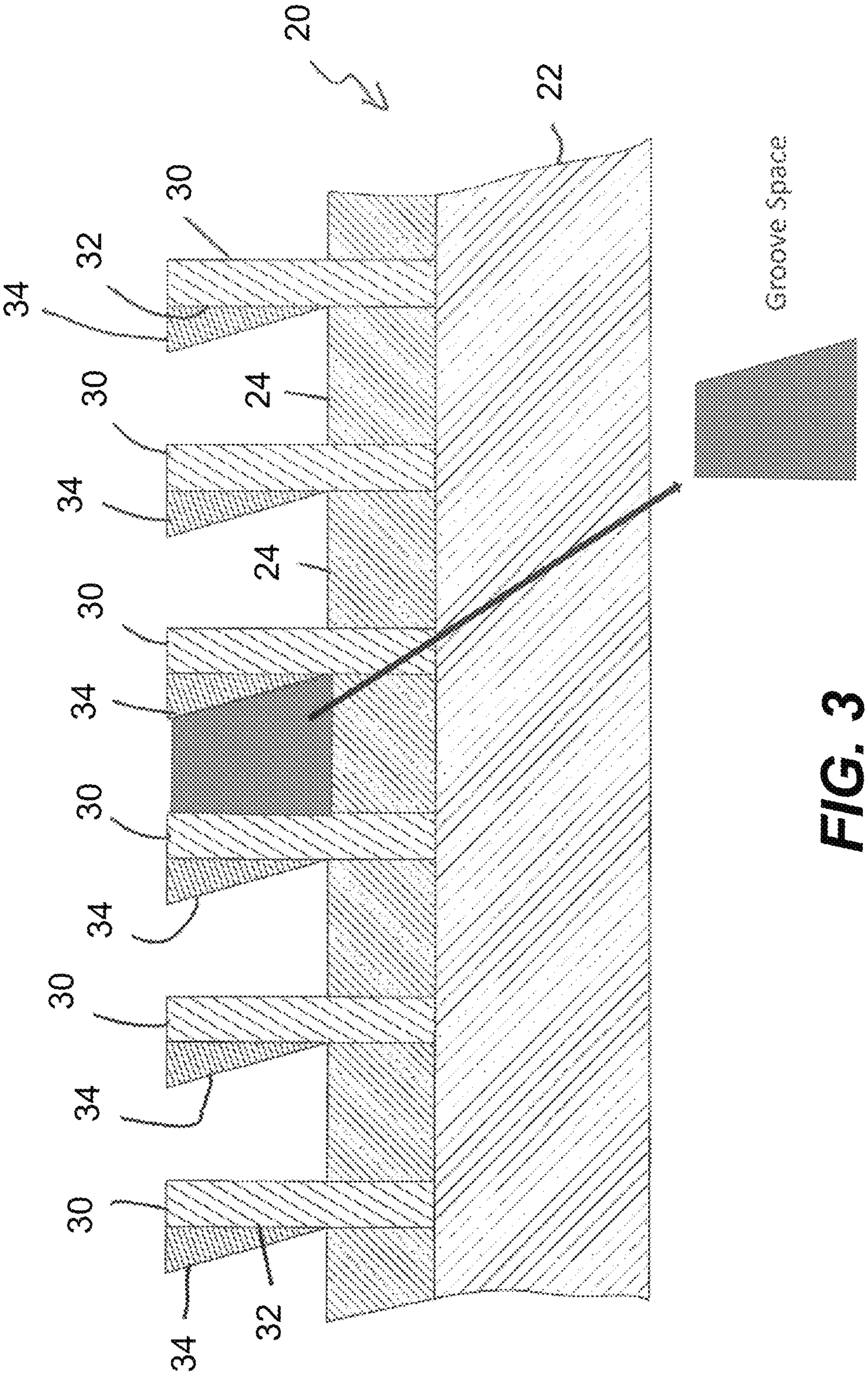
FIG. 3 is a cross-sectional view of a refiner filling piece having a variable coating on a leading surface of the bars.

FIG. 3 is a cross-sectional view of a refiner filling piece 20 having a variable coating 34 on a leading surface 32 of the bars 30. In the embodiment depicted in FIG. 3, the variable coating 34 has a coating thickness that varies axially with the bar height.

As shown in FIG. 3, the coating thickness in this example embodiment increases linearly with the bar height.

FIG. 3 also denotes a groove space that occupies the volume between a trailing surface of one bar and the coated leading surface of the bar immediately behind it. The coating on the leading surface of the bar inhibits wear of the bar and thus preserves the hydraulic capacity of the refiner by maintaining a desired groove space between adjacent bars.

Figure 4:
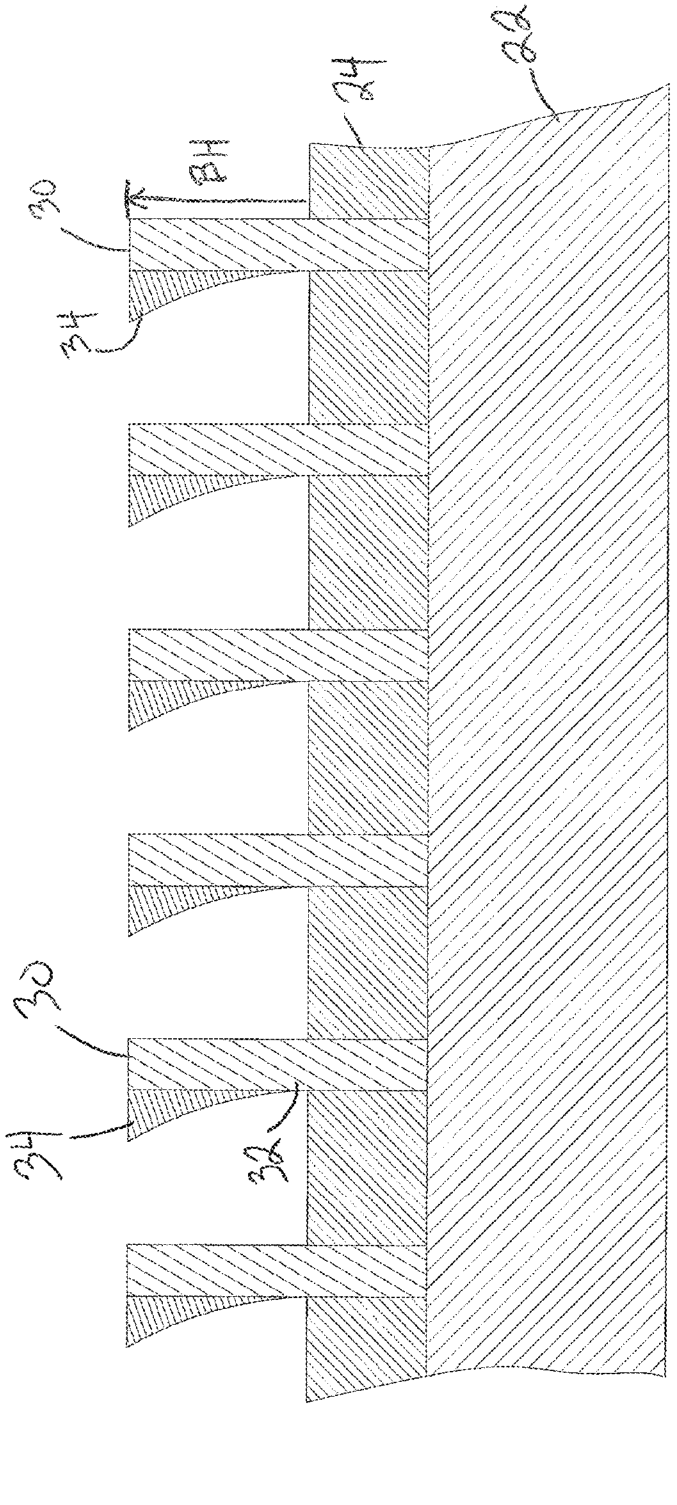
FIG. 4 is a cross-sectional view of a refiner filling piece having a variable coating on a leading surface of the bars.

Alternatively, in the embodiment depicted in FIG. 4, the variable coating 34 on the leading surface 32 of the bars 30 has a coating thickness that, for example, increases non-linearly with bar height. For example, in one specific implementation, the nonlinear coating may be coated parabolically or exponentially with the bar height. For example, the coating thickness may increase as a function of the square of the axial height.

Figure 5:
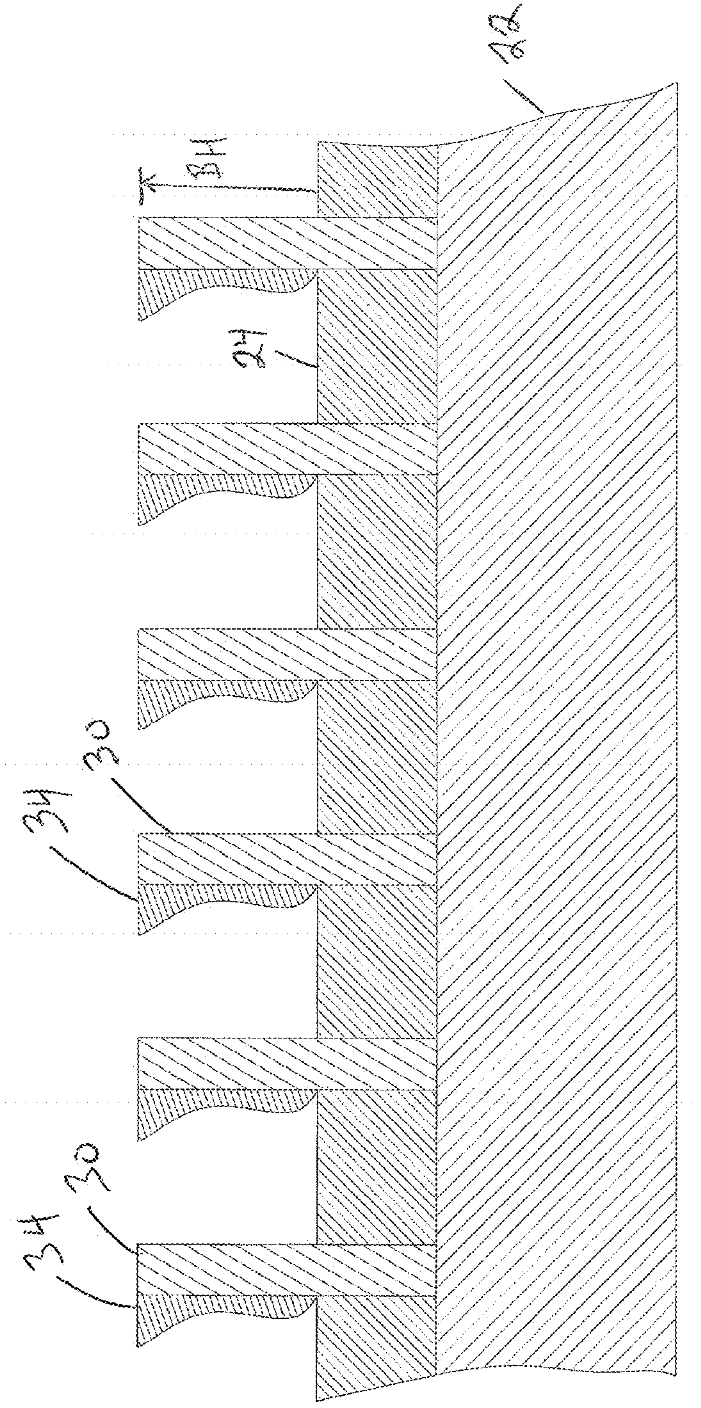
FIG. 5 is a cross-sectional view of a refiner filling piece having a variable coating on a leading surface of the bars.

Alternatively, in the embodiment depicted in FIG. 5, the variable coating 34 on the leading surface 32 of the bars 30 has a coating thickness that, for example, increases over a first portion of the bar height, then decreases over a second portion of the bar height and then increases over a third portion of the bar height.

Figure 6:
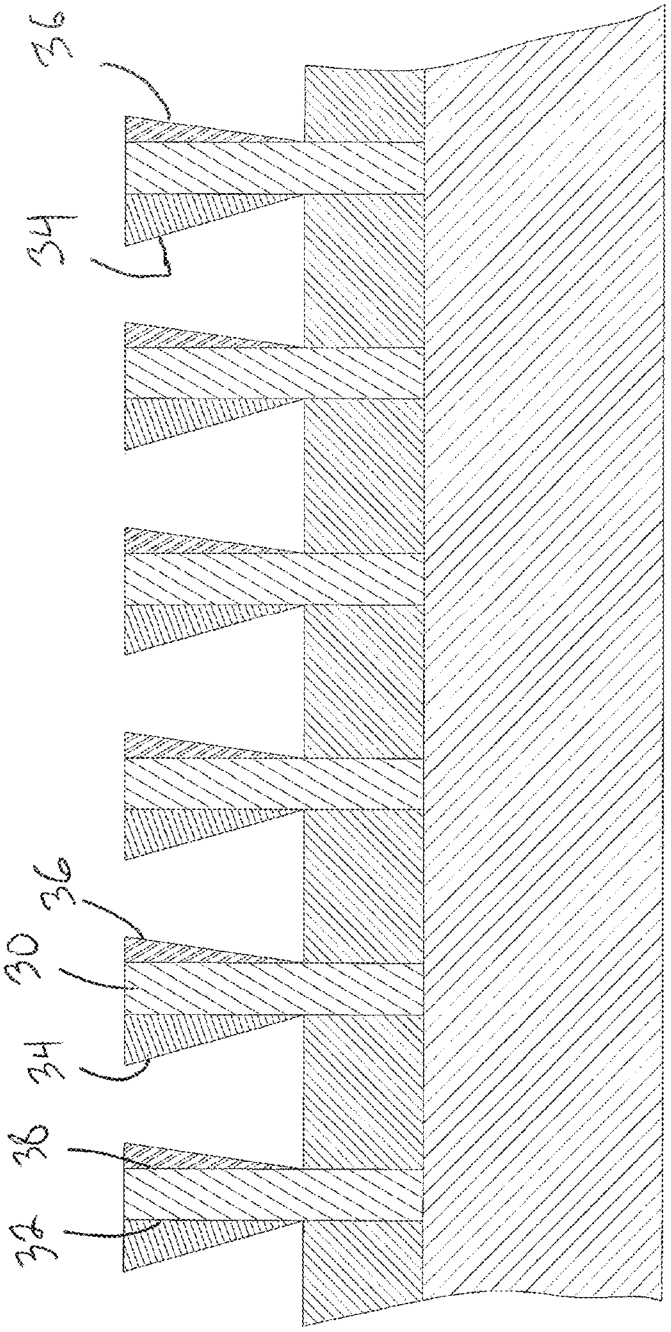
FIG. 6 is a cross-sectional view of a refiner filling piece having a variable coating on a leading surface and a thinner variable coating on the trailing surface.

FIG. 6 is a cross-sectional view of a refiner filling piece 20 having a variable coating 34 on a leading surface 32 and a thinner variable coating 36 on the trailing surface 38. In the specific example of FIG. 6, both the coatings on the leading and trailing surfaces increase linearly with the bar height although at different rates.

Figure 7:
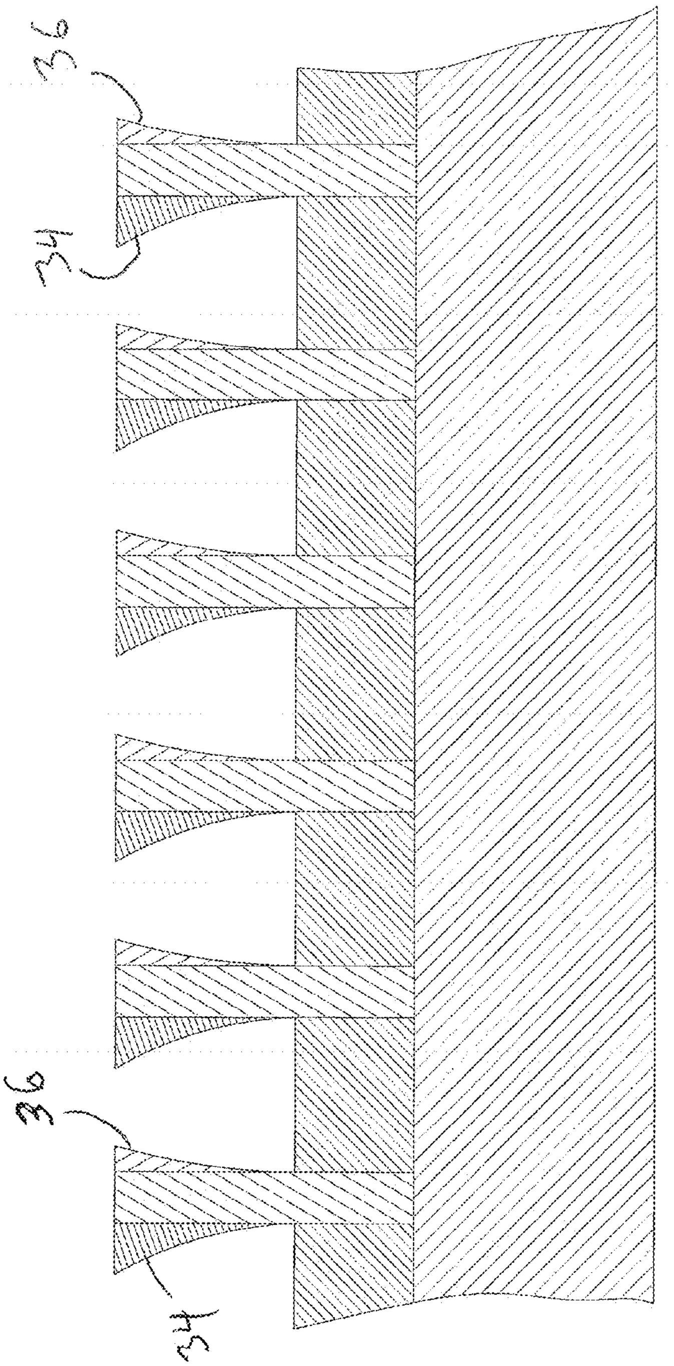
FIG. 7 is a cross-sectional view of a refiner filling piece having a variable coating on a leading surface and a thinner variable coating on the trailing surface.

In the example embodiment depicted in FIG. 7, both the leading and trailing surfaces 32, 38 have respective variable coatings 34, 36 that increase nonlinearly with the bar height although at different rates.

Figure 8:
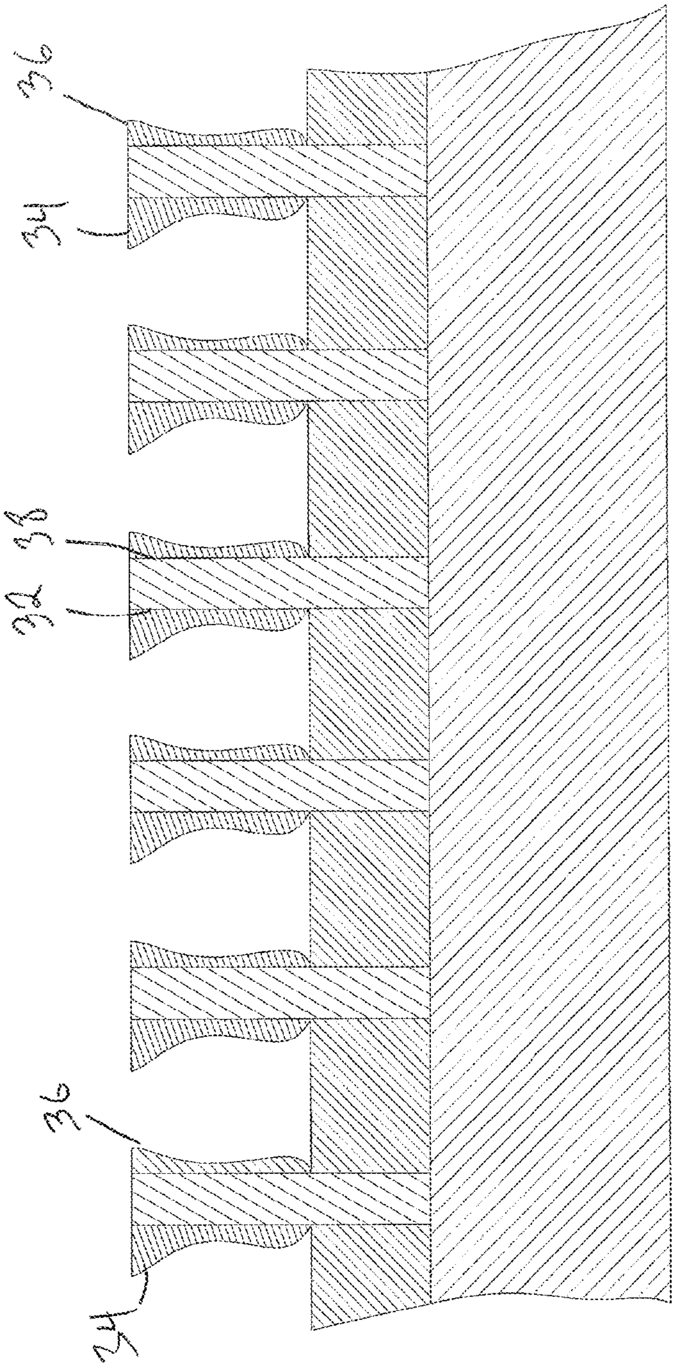
FIG. 8 is a cross-sectional view of a refiner filling piece having a variable coating on a leading surface and a thinner variable coating on the trailing surface.

In the example embodiment depicted in FIG. 8, the trailing surface has a thinner variable coating than the variable coating on the leading surface as in FIGS. 6 and 7. In FIG. 8, the thinner variable coating increases over the first portion of the bar height, then decreases over the second portion of the bar height and then increases over the third portion of the bar height.

Figure 9:
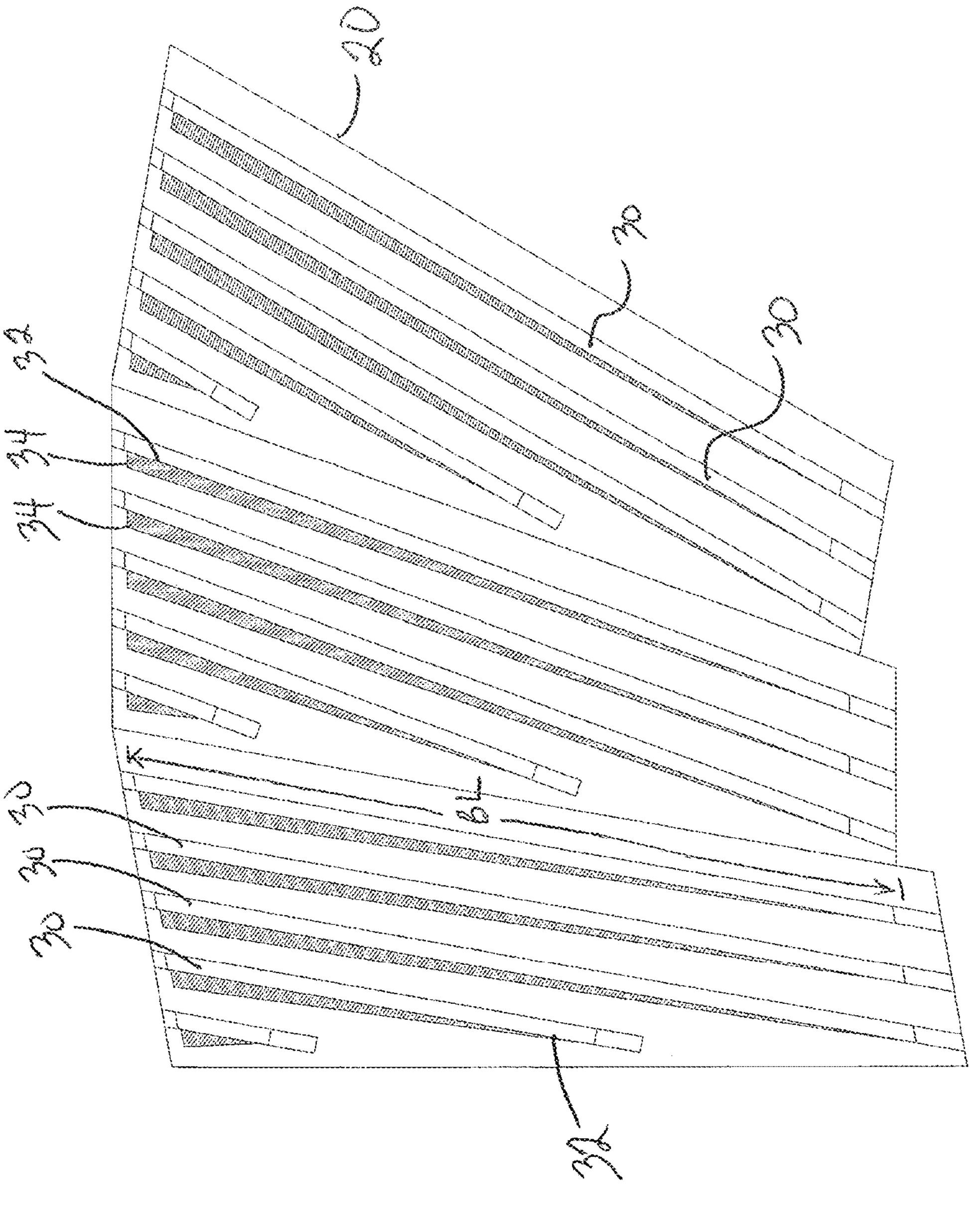
FIG. 9 is a top view of a refiner filling piece in accordance with one embodiment of the invention in which the variable coating varies linearly along a bar length on the leading surface.

FIG. 9 is a top view of a refiner filling piece 20 in accordance with one embodiment of the invention in which the variable coating 34 varies radially along a bar length BL on the leading surface 32. Specifically, in this example, the variable coating has a coating thickness that varies linearly along the bar length.

Figure 10:
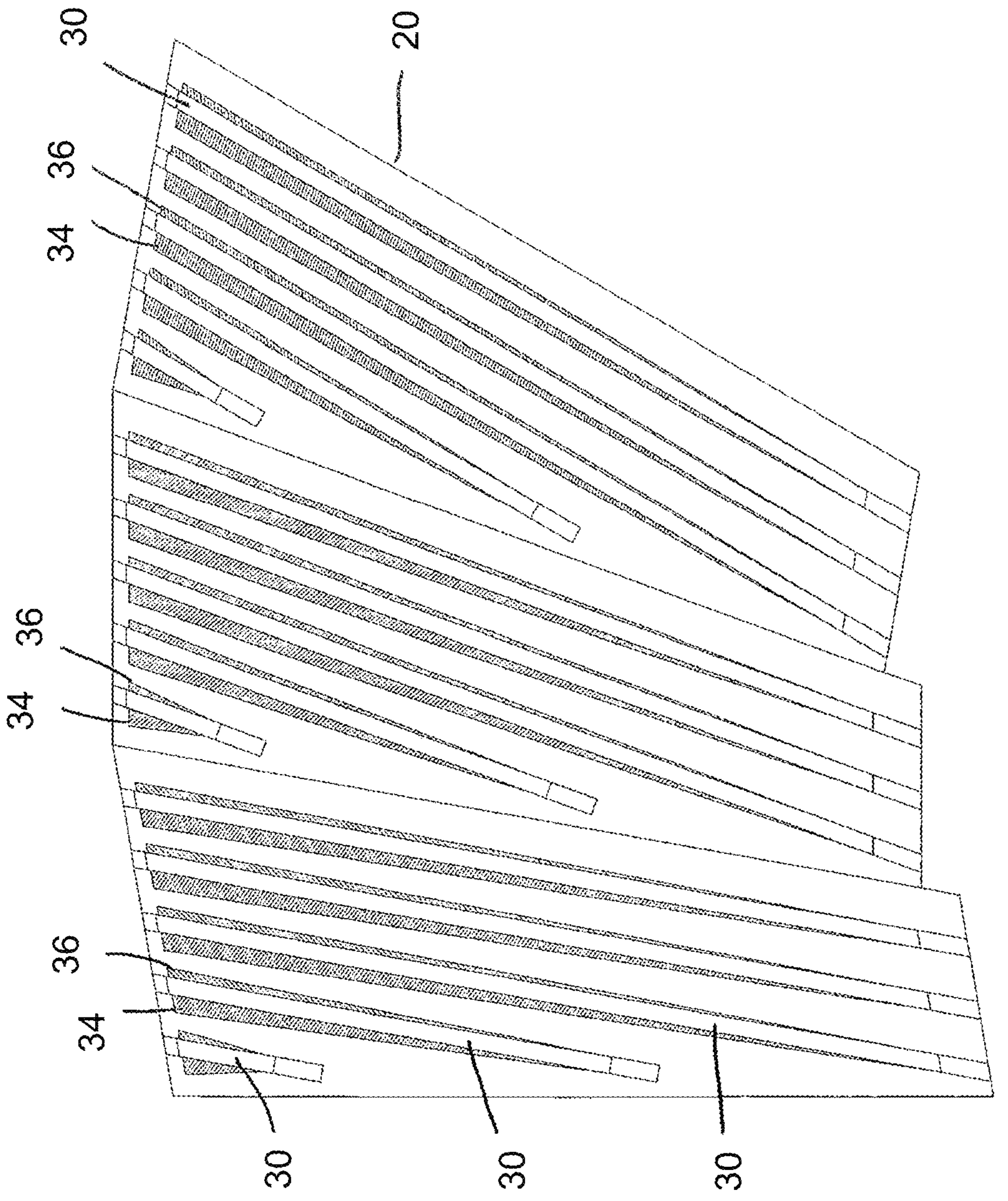
FIG. 10 is a top view of a refiner filling piece in accordance with another embodiment of the invention in which the variable coating varies linearly along a bar length on the leading surface and a thinner variable coating varies along the bar length on the trailing surface.

FIG. 10 is a top view of a refiner filling piece 20 in accordance with another embodiment of the invention in which the variable coating 34 varies radially along a bar length BL on the leading surface 32 and a thinner variable coating 36 varies radially along the bar length BL on the trailing surface 38. In this specific example, the variable coating has a coating thickness that varies linearly along the bar length. As shown in FIG. 10, the trailing surface has a thinner variable coating than the variable coating on the leading surface.

Figure 11:
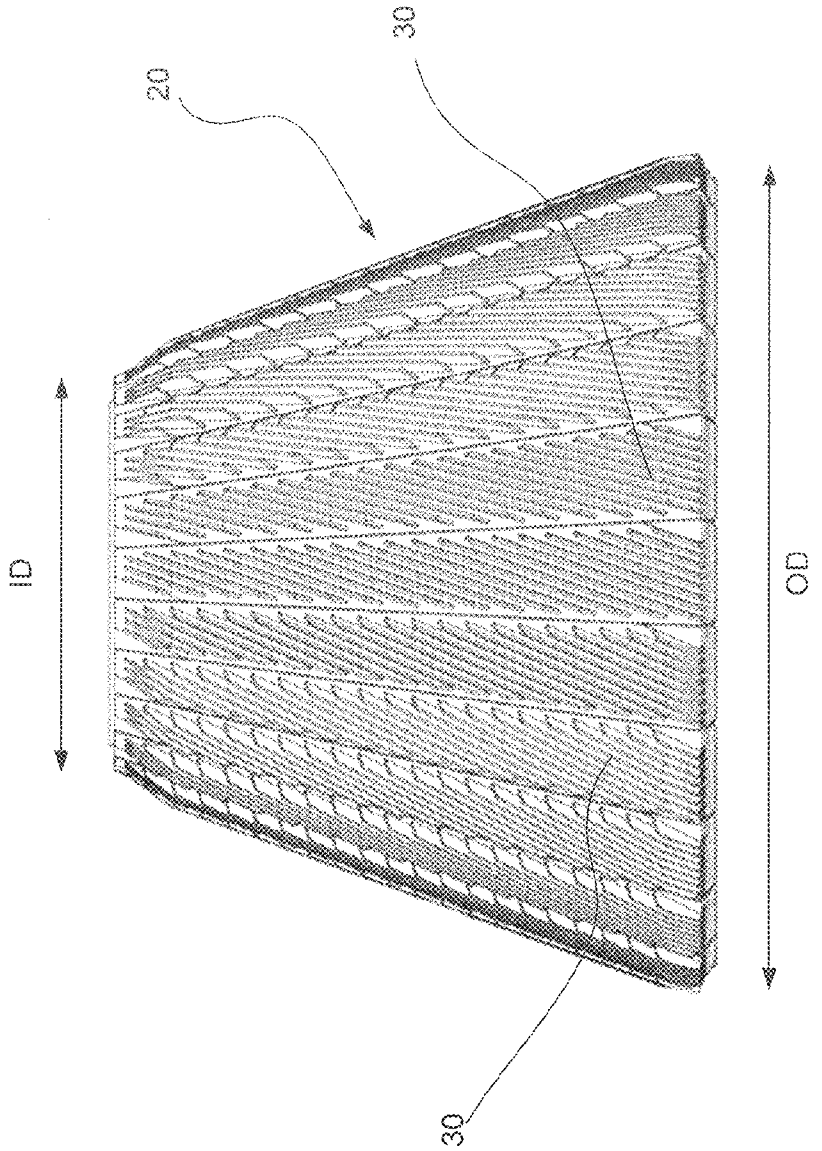
FIG. 11 depicts a conical refiner filling piece to which a variable coating may be applied in accordance with another embodiment of the invention.

FIG. 11 depicts a conical refiner filling piece 20 to which a variable coating may be applied in accordance with another embodiment of the invention. The conical refiner filling piece 20 is characterized by an inner diameter ID and an outer diameter OD as denoted in FIG. 11. The refining bars 30 of the conical refiner filling piece 20 have a variable coating as described above which may vary in all of the different ways discussed above. In this example, the conical refiner filling piece 20 is a single unitary component defining the complete conical structure although it will be appreciated that the conical refiner filling piece may be a segmented conical filling piece that is assembled with other segmented conical filling pieces to constitute the complete conical (or frusto-conical) structure.

In some embodiments, the leading surface of all refiner bars has the variable coating, i.e. all of the refiner bars are coated with the variable coating. In other embodiments, only some of the leading surfaces of the refiner bars have the variable coating. For example, an alternating pattern of coated and uncoated bars may be implemented. As another example, every third or fourth bar may be coated. Conversely, every third or fourth bar may be uncoated.

In some embodiments, the variable coating extends along all of the bar length. In other embodiments, the variable coating extends only partially along the bar length. For example, the variable coating may extend over 90%, 80%, 70%, 60%, 50%, 40%, 30%, 20%, 10%, etc. of the length. As another example, one bar may be coated a first percentage with the next bar being coated a different percentage. In some embodiments, the variable coating extends from the base to the top of the bar, i.e. the coating covers all of the bar height. In other embodiments, the variable coating extends only over a portion of the bar height. For example, the variable coating may begin at a point higher than the base, e.g. the midpoint, at a quarter of the height, a third of the height, three-quarters of the height, etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This invention has been described in terms of specific embodiments, implementations and configurations which are intended to be exemplary only. Persons of ordinary skill in the art will appreciate that many obvious variations, refinements and modifications may be made without departing from the inventive concept(s) presented in this application. The scope of the exclusive right sought by the Applicant is therefore intended to be limited solely by the appended claims.

The invention claimed is:

1. A refiner filling piece for a refiner having a rotor that rotates about an axis of rotation and cooperates with a stator to mechanically treat a pulp containing cellulosic fibers, the refiner filling piece being mountable to the rotor or the stator, the refiner filling piece comprising:

a base;

a plurality of spaced-apart refiner bars, each refiner bar being defined by a bar length and a bar height; and wherein at least some of the refiner bars have a surface coated with a variable thickness coating, wherein the variable thickness coating begins at a point that is between a midpoint of the bar height and a quarter of the bar height above the base.

2. The refiner filling piece of claim 1 wherein the surface is a leading surface.

3. The refiner filling piece of claim 1 wherein the variable coating has a coating thickness that varies along the bar length.

4. The refiner filling piece of claim 3 wherein the variable coating has a coating thickness that varies linearly along the bar length.

5. The refiner filling piece of claim 4 further comprising a trailing surface that has a thinner variable coating than the variable coating on the leading surface at a particular cross-section of the refiner bar.

6. The refiner filling piece of claim 1 wherein the leading surface of all refiner bars has the variable coating.

7. The refiner filling piece of claim 1 wherein only some of the leading surfaces of the refiner bars have the variable coating.

8. The refiner filling piece of claim 1 wherein the variable coating extends along all of the bar length.

9. The refiner filling piece of claim 1 wherein the variable coating extends only partially along the bar length.

10. The refiner filling piece of claim 1 wherein the variable coating has a coating thickness that varies with the bar height.

11. The refiner filling piece of claim 10 wherein the coating thickness increases linearly with the bar height.

12. The refiner filling piece of claim 10 wherein the coating thickness increases nonlinearly with the bar height.

13. The refiner filling piece of claim 10 wherein the coating thickness increases over a first portion of the bar height, then decreases over a second portion of the bar height and then increases over a third portion of the bar height.

14. The refiner filling piece of claim 10 comprising a trailing surface that has a thinner variable coating than the variable coating on the leading surface at a particular cross-section of the refiner bar.

15. The refiner filling piece of claim 11 comprising a trailing surface that has a thinner variable coating than the variable coating on the leading surface and wherein the thinner variable coating increases linearly with the bar height.

16. The refiner filling piece of claim 12 comprising a trailing surface that has a thinner variable coating than the variable coating on the leading surface and wherein the thinner variable coating increases nonlinearly with the bar height.

17. The refiner filling piece of claim 13 comprising a trailing surface that has a thinner variable coating than the variable coating on the leading surface and wherein the thinner variable coating increases over the first portion of the bar height, then decreases over the second portion of the bar height and then increases over the third portion of the bar height.

18. A refiner comprising:
- a housing;
- a stator supported within the housing;
- a rotor that rotates about an axis of rotation and cooperating with the stator to mechanically treat a pulp containing cellulosic fibers;
- a first refiner filling piece as defined in claim 1 fastened to the rotor;
- a second refiner filling piece as defined in claim 1 fastened to the stator.

* * * * *